United States Patent [19]

Nowogrodzki

[11] Patent Number: 4,872,014

[45] Date of Patent: Oct. 3, 1989

[54] OBJECT IDENTIFICATION SYSTEM AND METHOD UTILIZING RADIOMETRY

[75] Inventor: Markus Nowogrodzki, Sussex, N.J.

[73] Assignee: General Electric Company, Schenectady, N.Y.

[21] Appl. No.: 696,716

[22] Filed: Jan. 31, 1985

[51] Int. Cl.⁴ .......................... G01S 3/02; G01S 13/74
[52] U.S. Cl. ...................................... 342/351; 342/44
[58] Field of Search ............... 343/351, 6.5 SS, 6 ND, 343/55 A; 250/250

[56] References Cited

U.S. PATENT DOCUMENTS

| | | | |
|---|---|---|---|
| 3,028,596 | 4/1962 | McGillem et al. | 343/351 |
| 3,680,111 | 7/1972 | Killion et al. | |
| 3,735,405 | 5/1973 | Berg | |
| 4,106,345 | 8/1978 | Saunders et al. | 342/170 |
| 4,119,968 | 10/1978 | Goldfischer | 343/351 |
| 4,150,379 | 4/1979 | Connors | |
| 4,292,636 | 9/1981 | Egger et al. | |
| 4,345,840 | 8/1982 | Goetz et al. | 250/339 |
| 4,415,989 | 11/1983 | Gaunaurd et al. | 343/55 A |

OTHER PUBLICATIONS

Skolnik, *Radar Handbook*, 1970 McGraw-Hill Inc. 39-34-35.

Primary Examiner—Thomas H. Tarcza
Assistant Examiner—Gregory C. Issing
Attorney, Agent, or Firm—Henry I. Steckler; James C. Davis, Jr.; Paul R. Webb, II

[57] ABSTRACT

The totally passive object identification system and method involves the use of a radiometer to produce a signal corresponding to the radiation pattern generated by an object of interest in the frequency band to which the radiometer is sensitive, and involves comparing the produced signal with a signal corresponding to a given class of objects. The comparator produces a signal indicative of correspondence or a lack of correspondence between the object of interest and the given class of objects.

4 Claims, 1 Drawing Sheet

U.S. Patent     Oct. 3, 1989     4,872,014

OBJECT IDENTIFICATION SYSTEM AND METHOD UTILIZING RADIOMETRY

BACKGROUND OF INVENTION

1. Field of Invention

This invention is concerned with a passive object identification system and method and more particularly with such a system and method employing a radiometer and radiometry measurements respectively.

2. Description of the Prior Art

There are any number of systems for identifying tagged objects which operate by illuminating the tag with microwave energy and then receiving back from the tag a coded signal. The coded signal may be as simple as double the frequency of the illuminating signal as typically used in department stores to identify merchandise or to prevent merchandise from being stolen. Alternatively the coded signal may be some type of digital code uniquely identifying the tag and thus the target to which it is attached. Other radio frequency systems that utilize interrogators and cooperating transponders are also known. In a military environment, the use of illuminating electromagnetic radiation at any frequency is undesirable as the enemy can discover the source of the energy radiation and neutralize the source. Yet it is important to be able to distinguish a friendly vehicle from an enemy vehicle by other than visual means.

SUMMARY OF INVENTION

In accordance with a preferred embodiment of the present invention, a method for use in distinguishing one class of objects from another class of objects distinguished by differences in their electromagnetic radiation patterns by use of a radiometer comprises the steps of receiving at the radiometer a radiation pattern signal emanated from an object of interest and comparing the received radiation pattern signal against a stored radiation pattern signal corresponding to the radiation signal pattern from the first class of objects and producing a signal indicating a correspondence or lack of correspondence. Apparatus for distinguishing the one class of objects from another class of objects comprises, in combination, means for producing a signal corresponding to the radiation pattern radiated from an object of interest, means receptive of the signal and receptive of a stored signal corresponding to a radiation pattern detected from an object of the one class and means indicating a correspondence or lack of correspondence of the object of interest as belonging or not belonging to the one class.

DETAILED DESCRIPTION OF THE PREFERRED EMBODIMENT

Figure 1:
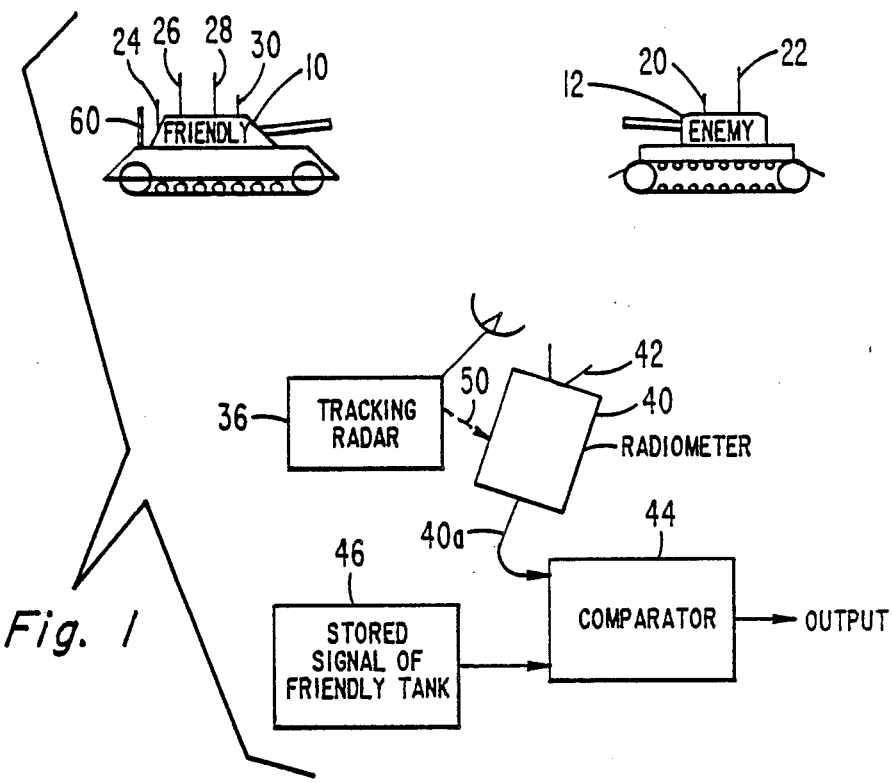
FIG. 1 is an electrical and physical arrangement of the components of the preferred embodiment of the present invention.

Referring now to FIG. 1 there are illustrated two vehicles which, by way of example, may be tanks 10 and 12 respectively. Tanks 10 and 12 are exemplary of two classes of vehicles or other objects which are to be distinguished from one another. For purposes of the invention the vehicles are distinguished by the number and placement of resonant circuits. These circuits may be resonators placed on the vehicle for other purposes (e.g. communications antennas) or circuits specifically designed to provide a radiometric "signature" of the vehicle, and not serving any other purpose. For example tank 12, assumed to be an enemy tank, has two antennas 20 and 22 respectively while tank 10, assumed to be a friendly tank, has four antennas 24, 26, 28 and 30 respectively. Each of these antennas acts as a resonator at certain frequency bands. The overall radiometric signal of each vehicle differs from the other over a given frequency band. The system for distinguishing one vehicle from the other comprises a radiometer 40, a comparator 44 and a stored source of signal 46. A tracking radar 36, of conventional design, may be part of an overall system if tracking of the vehicles is desired. The dashed line 50 connected between tracking radar 36 and radiometer 40 indicates the two components are coupled together for tracking purposes. When radiometer 40 has its receiving antenna directed to a target of potential interest a radiation signal is generated on its output conductor 40a.

For practical reasons, such as the size of the receiving antenna and the directivity of the radiometric measurements, radiometers operating in the microwave range are likely to be employed. The circuits placed on the target vehicle which provide the characteristic "signature" of the measurement must have resonances within the passband of the radiometric receiver.

Figure 2A:
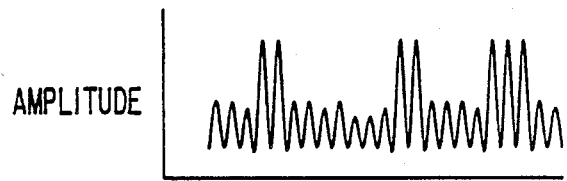
FIGS. 2a and 2b are plots of frequency versus amplitude of a simulated radiation pattern from a friendly object and enemy object respectively.
Figure 2B:
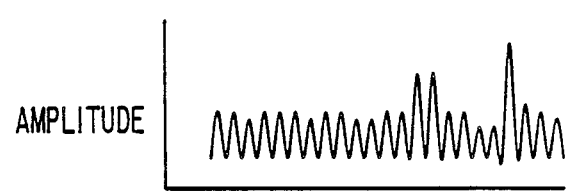

FIGS. 2a and 2b are plots of two radiation signals for vehicles 10 and 12 respectively. Each plot is illustrated with a frequency on the horizontal axis versus amplitude on the vertical axis. Owing to the number, placement and types of existing resonant circuits on the respective vehicles 10 and 12, the radiation patterns are quite different. Additional resonators, such as 60, may be added to one class of vehicles to more readily distinguish it from the other class. Such resonators can take different geometric forms such as for example resonant conductive strips (radiating material painted on the object), patch antennas, etc.

The signal produced by radiometer 40 is compared in comparator 44 with the source of stored signals representing one class of vehicle such as tank 10. If the two signals differ, an appropriate signal is produced in the output of comparator 44 in response to which appropriate action may be taken.

It will be understood that although the types of vehicles described are tanks, there may be a need to distinguish other vehicle types or to distinguish one vehicle type from a fixed object. For example, in open pit mines the dust can become so thick that it becomes impossible to see other vehicles and collisions between vehicles have been known to occur. Obviously in such situations it is desired to be alerted to the presence of other vehicles which may be a threat, as distinguished from fixed objects not in the vehicle path; or to detect a particular vehicle among a group.

What is claimed is:

1. A method for use in distinguishing one class of objects from another class of objects distinguished by differences in their response patterns by use of a radiometer comprises the steps of:

ensuring the existence on said one class of objects of a structure having at least one resonance at a frequency not present in the radiometric signal response from the other class of objects;

receiving at the radiometer a radiation pattern signal emanated from an object of interest;

comparing the received radiation pattern signal against a stored radiation pattern signal corresponding to the radiation signal pattern from the one class of objects; and producing a signal indicating a correspondence or lack of correspondence between the signals.

2. Apparatus for distinguishing one class of objects from another class of objects distinguished by differences in their electromagnetic radiation patterns, comprising in combination;

means placed on said one class of objects having at least one resonance at a frequency within the radiometric signal response of said means for producing a signal not present in the response from the other class of objects;

means for producing a signal corresponding to the radiation pattern radiated from an object of interest;

means receptive of the signal and receptive of a stored signal corresponding to a detected radiation pattern from an object of said one class; and means indicating a correspondence or lack of correspondence of the object of interest as belonging or not belonging to said one class.

3. The combination as set forth in claim 2 wherein said apparatus is sensitive to radiation in the microwave frequency band.

4. The combination as set forth in claim 3 wherein each of said objects includes an antenna which is resonant in the microwave frequency band.

* * * * *